United States Patent
Biskeborn et al.

(10) Patent No.: US 12,087,336 B1
(45) Date of Patent: Sep. 10, 2024

(54) TAPE HEADS HAVING SHIFTED ARRAY/PAD ARRANGEMENTS

(71) Applicant: Western Digital Technologies, Inc., San Jose, CA (US)

(72) Inventors: Robert G. Biskeborn, Hollister, CA (US); David J. Seagle, Morgan Hill, CA (US); Diane L. Brown, San Jose, CA (US); Trevor W. Olson, San Jose, CA (US); Michael T. Babin, Sr., Saratoga, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/370,273

(22) Filed: Sep. 19, 2023

(51) Int. Cl.
*G11B 5/48* (2006.01)
*G11B 5/008* (2006.01)
*G11B 5/592* (2006.01)

(52) U.S. Cl.
CPC ........ *G11B 5/4893* (2013.01); *G11B 5/00813* (2013.01); *G11B 5/5926* (2013.01)

(58) Field of Classification Search
None
See application file for complete search history.

(56) References Cited

U.S. PATENT DOCUMENTS

| | | | |
|---|---|---|---|
| 5,521,780 A * | 5/1996 | Asai | G11B 23/087 |
| 6,424,499 B1 | 7/2002 | Balakrishnan et al. | |
| 6,433,956 B1 * | 8/2002 | Peters | G11B 33/122 |
| 6,570,738 B1 * | 5/2003 | McKinstry | G11B 5/584 |
| 6,606,216 B1 | 8/2003 | Liikanen et al. | |
| 6,914,744 B1 | 7/2005 | Wang | |
| 7,551,393 B2 * | 6/2009 | Biskeborn | G11B 5/4893 |
| | | | 360/316 |
| 8,045,290 B2 | 10/2011 | McKinstry et al. | |
| 8,988,817 B1 | 3/2015 | Cherubini et al. | |
| 9,177,571 B2 | 11/2015 | Cherubini et al. | |
| 10,269,378 B1 | 4/2019 | Miyamura et al. | |
| 11,114,117 B1 | 9/2021 | Seagle et al. | |
| 2001/0036042 A1 * | 11/2001 | Ajiki | G11B 5/3903 |
| | | | 360/316 |

(Continued)

OTHER PUBLICATIONS

Cherubini, Giovanni et al., "Fast servo signal acquisition in tape drives using servo and data channels", Elsevier, 2012, pp. 349-360.

*Primary Examiner* — Peter Vincent Agustin
(74) *Attorney, Agent, or Firm* — PATTERSON + SHERIDAN, LLP

(57) ABSTRACT

The present disclosure generally relates to a tape drive comprising one or more tape head modules. Each tape head module comprises a chip and a beam, such as a u-beam. Each chip comprises a first data element array and a second data element array, where each data element array comprises 33 write elements or 33 read elements and one or more servo element pairs. Each data element of both the first and second data element arrays is coupled to two pads. The pads and the data element arrays of each chip are offset in a first direction such that the pads and data element arrays are offset from a central axis a distance about one-half the span of either the first or second data element array. Either the first data element array or the second data element arrays is centered upon the central axis.

20 Claims, 11 Drawing Sheets

(56) References Cited

U.S. PATENT DOCUMENTS

| | | | |
|---|---|---|---|
| 2006/0039082 A1* | 2/2006 | Biskeborn | G11B 5/4893 360/129 |
| 2009/0268339 A1 | 10/2009 | Trabert et al. | |
| 2011/0255195 A1* | 10/2011 | Poorman | G11B 5/4893 |
| 2016/0232936 A1 | 8/2016 | Poorman et al. | |
| 2016/0372142 A1 | 12/2016 | Biskeborn et al. | |
| 2023/0081254 A1* | 3/2023 | Liang | G11B 5/4893 33/700 |

* cited by examiner

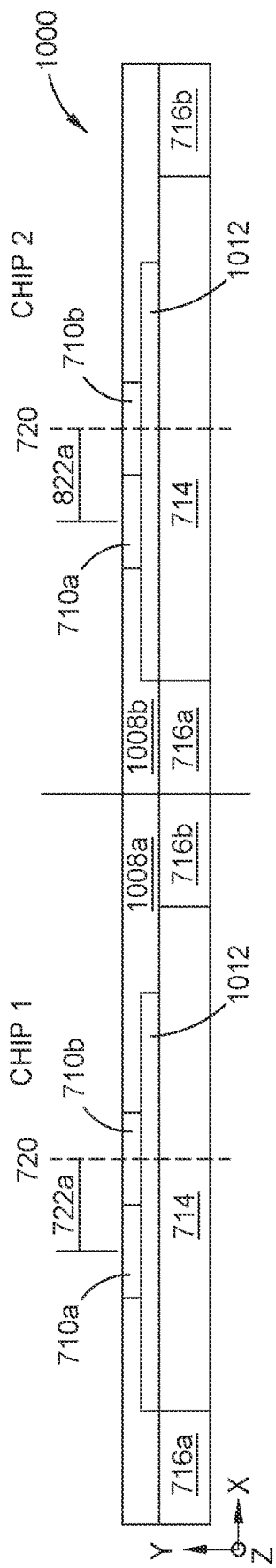
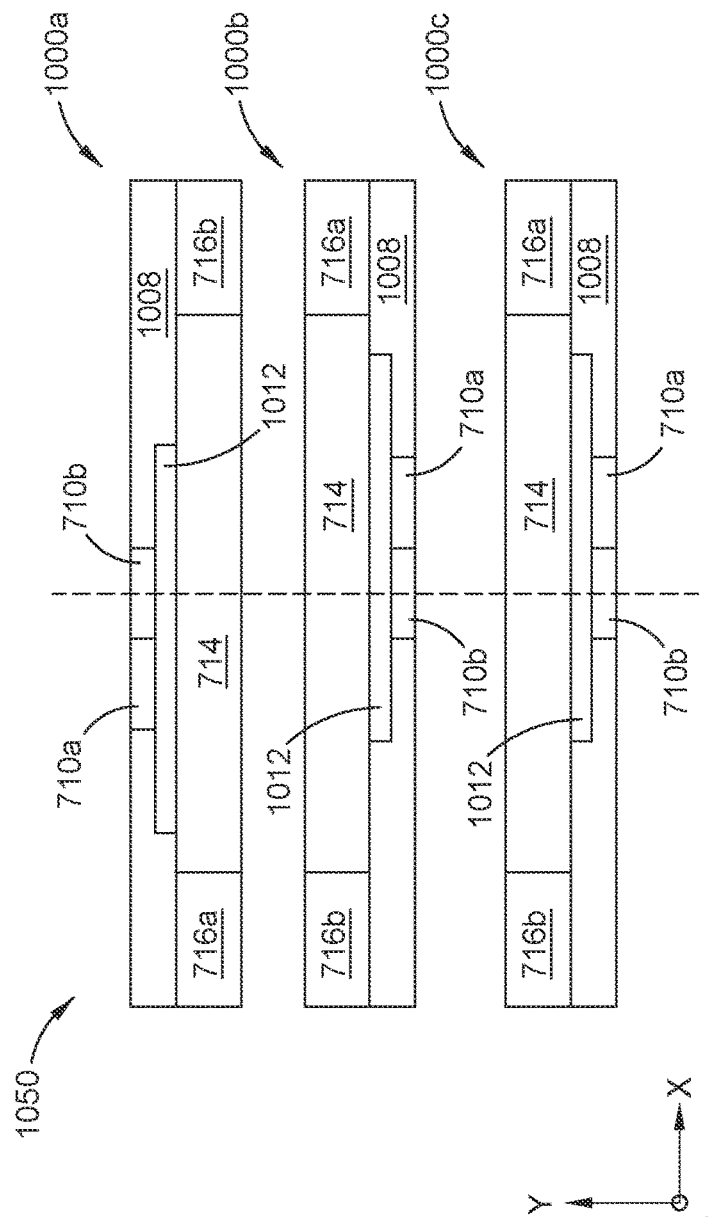
FIG. 10A
FIG. 10B

TAPE HEADS HAVING SHIFTED ARRAY/PAD ARRANGEMENTS

BACKGROUND OF THE DISCLOSURE

Field of the Disclosure

Embodiments of the present disclosure generally relate to a tape head and a tape drive including the tape head.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a location over the media where the data is to be stored. The magnetic write transducer then generates a magnetic field, which encodes the data into the magnetic media. Data is read from the media by the magnetic read transducer through sensing of the magnetic field of the magnetic media.

Tape drives generally come in two sizes, a full-high drive and a half-high drive. Due to the smaller size of the half-high drive, the half-high drive is generally more popular than the full-high drive, as the overall footprint of the half-high-drive is smaller. The half-high drive is smaller height-wise than the full-high drive, which limits the amount of data elements and servo element pairs that can be utilized to write and read data, as there is no room for more than 32 data elements to be wired and functional. Thus, the half-high drive is only capable of writing 32 channels or data tracks of a tape at a time. The full-height drive is not subject to this limitation and thus, can support increasing the number of concurrent channels to 64 channels or higher. However, there is a need that full-height and half-height drives must both write and read the same identical 32 channel format, meaning that the tapes so written in either drive are fully interchangeable for both write append and reading operations in both drives.

Due to head design and format constraints, there is a need for a tape drive that enables that aforementioned requirements.

SUMMARY OF THE DISCLOSURE

The present disclosure generally relates to a tape drive comprising one or more tape head modules. Each tape head module comprises a chip and a beam, such as a u-beam. Each chip comprises a first data element array and a second data element array, where each data element array comprises 33 write elements or 33 read elements and one or more servo element pairs. Each data element of both the first and second data element arrays is coupled to two pads. The pads and the data element arrays of each chip are offset in a first direction such that the pads and data element arrays are offset from a central axis a distance about one half the span of either the first or second data element array. Either the first data element array or the second data element arrays is centered upon the central axis.

In one embodiment, a tape head module comprises a chip, a first data element array disposed on the chip, the first data element array comprising a first plurality of data elements, a second data element array disposed on the chip, the second data element array comprising a second plurality of data elements, and a plurality of pads coupled to the first plurality of data elements and to the second plurality of data elements, wherein the first data element array, the second data element array, and the plurality of pads are shifted, from a central axis of the chip, a distance of about one-half the span of either the first or second data element array in a first direction.

In another embodiment, a tape drive comprises a first tape head module, the first tape head module comprising: a first chip, a first data element array disposed on the first chip, the first data element array comprising a first plurality of write elements, a second data element array disposed on the first chip, the second data element array comprising a second plurality of write elements, and a first plurality of pads coupled to the first plurality of write elements and to the second plurality of write elements, wherein the first plurality of pads are shifted, from a central axis of the chip, a distance of about one-half the span of either the first or second data element array in a first direction, and wherein the second data element array is centered upon a central axis of the first chip.

In yet another embodiment, a method of forming tape head module comprises dividing a wafer into a plurality of quadrants, dividing each quadrant into a plurality of row-bars, dividing each rowbar into a first chip and a second chip, forming a plurality of pads on each of the first and second chips, forming a first data element array on each of the first and second chips, the first data element array comprising a first plurality of data elements, wherein each data element of the first plurality of data elements is coupled to a pad of the plurality of pads, and forming a second data element array on each of the first and second chips, the second data element array comprising a second plurality of data elements, the second data element array being disposed adjacent to the first data element array, wherein each data element of the second plurality of data elements is coupled to a pad of the plurality of pads, wherein the first data element array, the second data element array, and the plurality of pads are shifted, from a central axis of the chip, a distance of about one-half the span of either the first or second data element array in a first direction.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 10A illustrates a plan view of a tape head module, according to one embodiment.

FIG. 10B illustrates a tape head assembly comprising three tape head modules of FIG. 10A, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a tape drive comprising one or more tape head modules. Each tape head module comprises a chip and a beam, such as a u-beam. Each chip comprises a first data element array and a second data element array, where each data element array comprises 33 write elements or 33 read elements and one or more servo element pairs. Each data element of both the first and second data element arrays is coupled to two pads. The pads and the data element arrays of each chip are offset in a first direction such that the pads and data element arrays are offset from a central axis a distance about one-half the span of either the first or second data element array. Either the first data element array or the second data element arrays is centered upon the central axis.

Figure 1A:
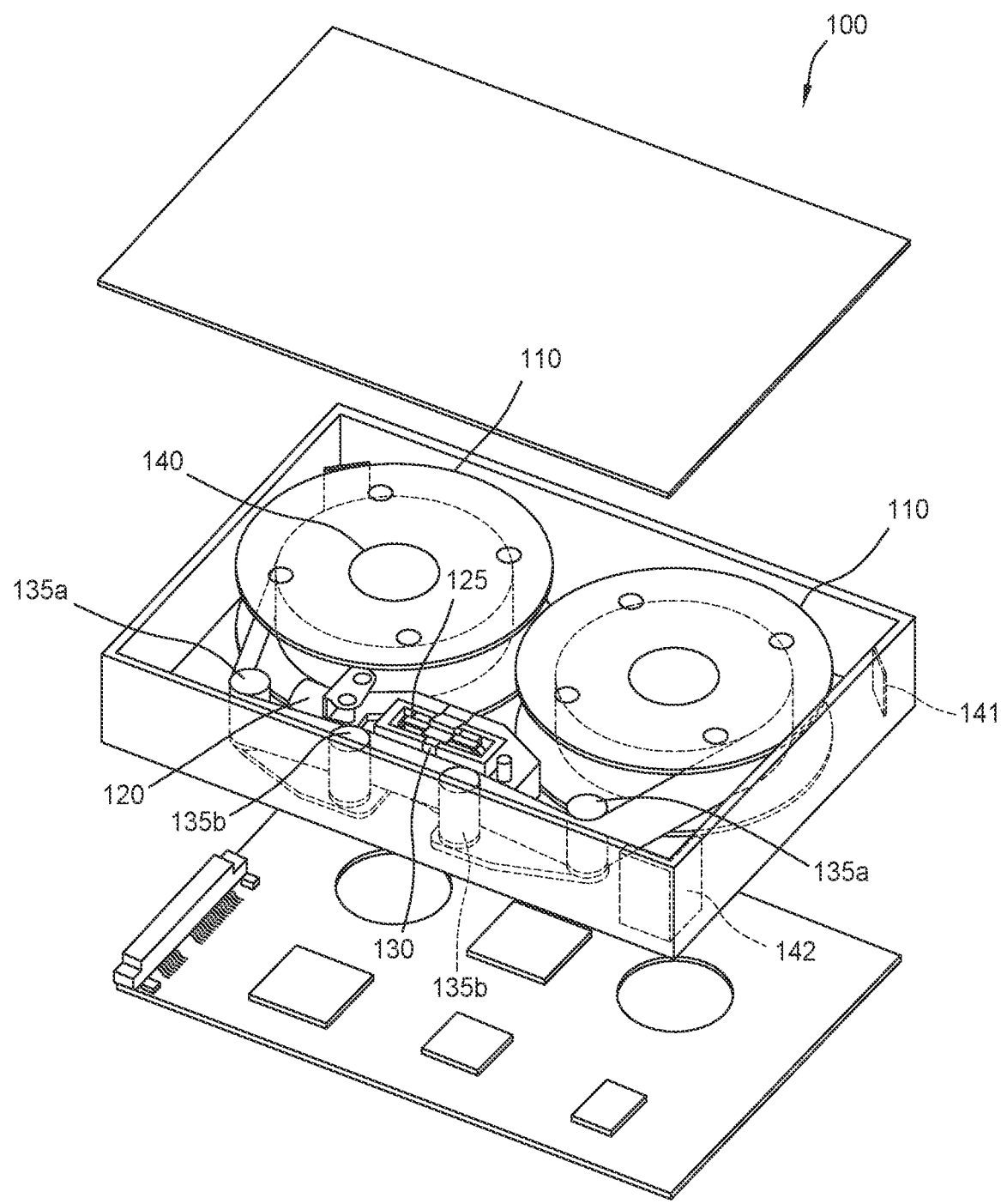
FIGS. 1A-1C illustrate a perspective exploded view, a simplified top down, and side profile view of a tape drive, in accordance with some embodiments.
Figure 1B:
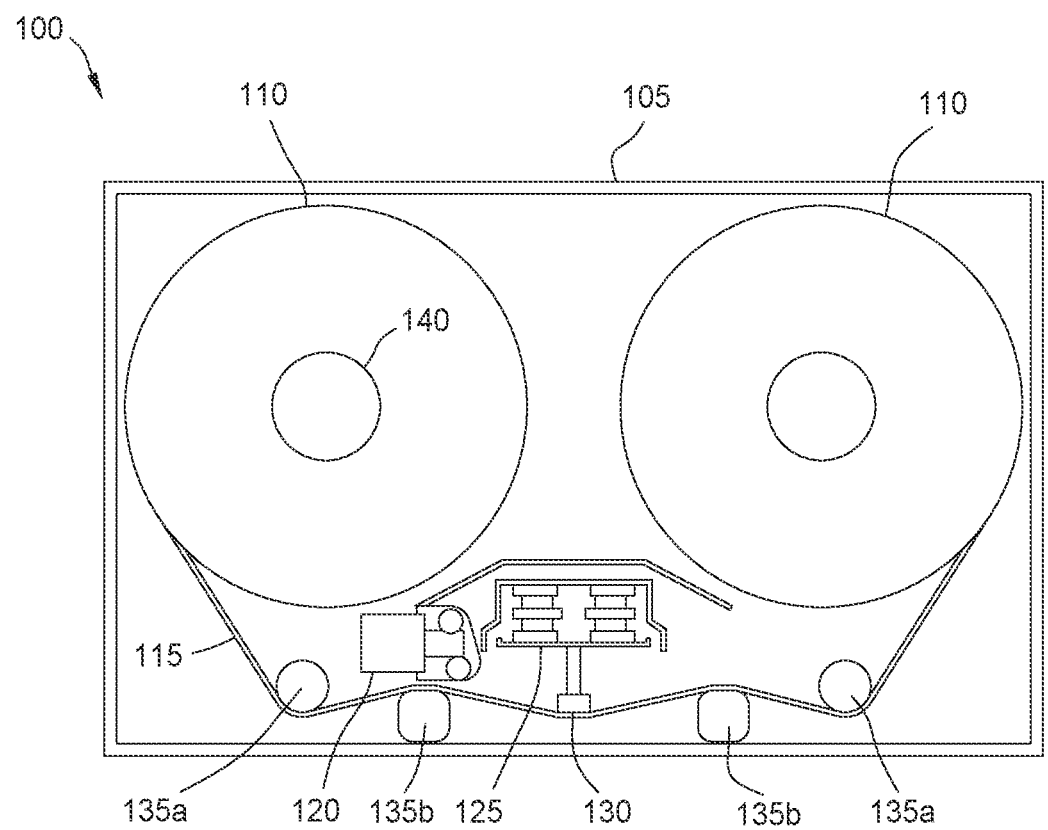
Figure 1C:
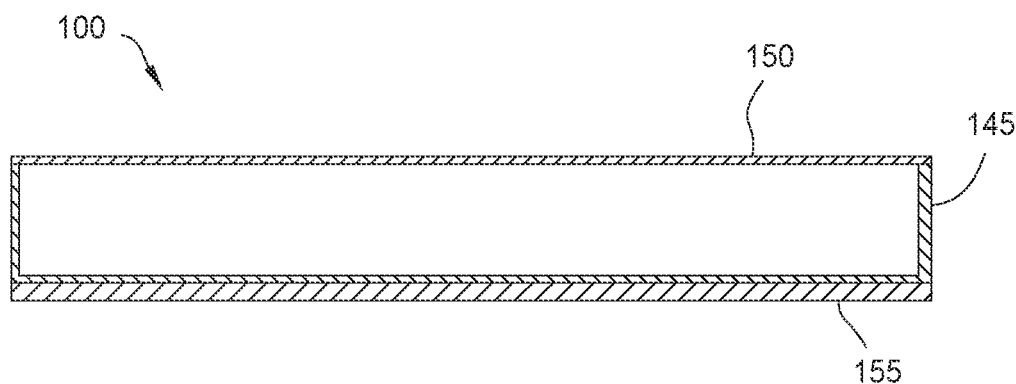

FIGS. 1A-1C illustrate a perspective exploded view, a simplified top down, and side profile view of a tape drive 100, in accordance with some embodiments. The tape drive 100 may be a captive tape drive or a tape embedded drive (TED). Focusing on FIG. 1B, for example, the tape drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape drive 100. In such embodiments, the tape drive 100 may not be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or media 115 is contained in a cartridge that is removable from the drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller 140 integrated circuits (IC) (or more simply "a controller 140") (e.g., in the form of one or more System on Chip (SoC)), along with other digital and/or analog control circuitry to control the operations of the drive. For example, the controller 140 and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller 140. As an example, the controller 140 may be configured to execute firmware instructions for the various same gap verify embodiments described below.

Figure 2:
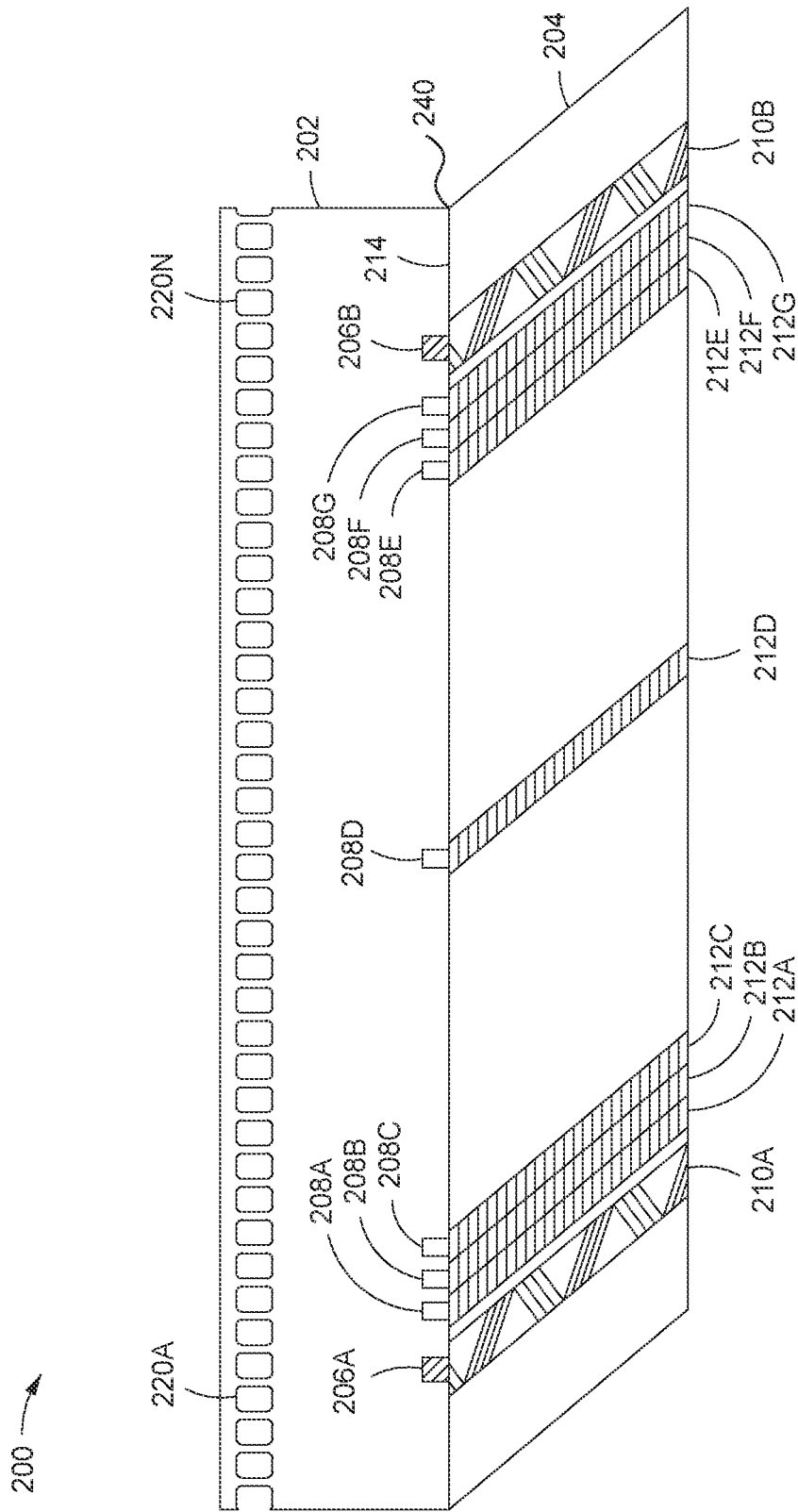
FIG. 2 is a schematic illustration of a tape head and tape that are aligned.

FIG. 2 is a schematic illustration of a tape head module 200 and a tape 204 that are aligned. The tape head module 200 comprises a tape head body 202 that is aligned with the tape 204. The tape 204 moves past the tape head module 200 during read and/or write operations. The tape head module 200 has a media facing surface (MFS) 214 that faces the tape 204. The tape head module 200 is coupled to a controller, which may be the controller 140 of FIG. 1.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head 200.

The tape 204 comprises a first servo track 210A and a second servo track 210B. The first servo track 210A and the second servo track 210B are spaced apart allowing the tape head 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape drive 200 to align the data heads 208A-208G such that the center data head (e.g., 208D) is centered on tape 204. The plurality of data heads 208A-208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3:
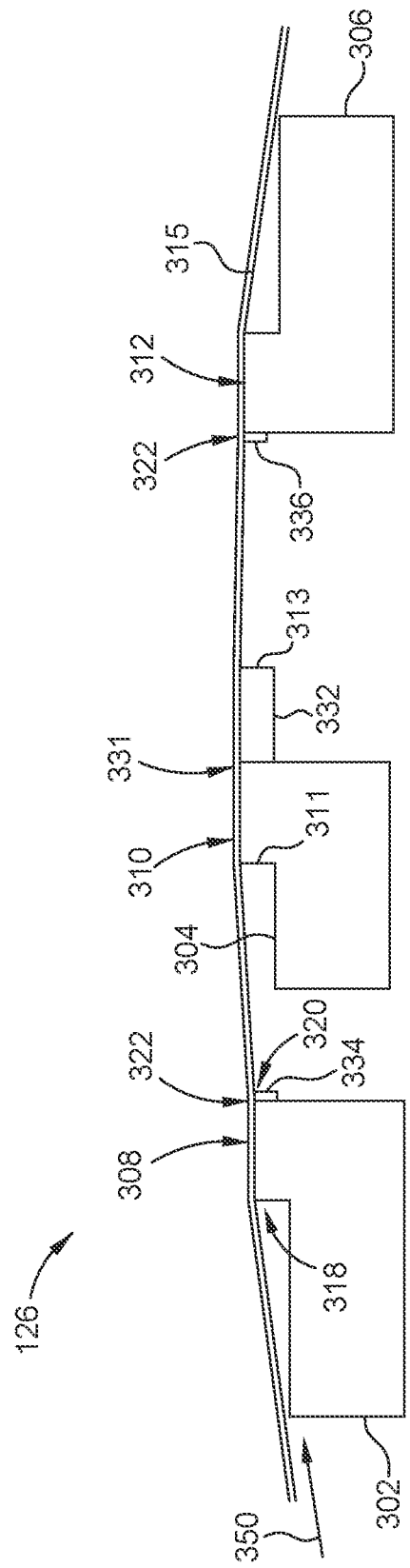
FIG. 3 illustrates a magnetic head according to one approach of the present invention that includes first, second and third modules each having a media facing surface, respectively, which may be flat, contoured, etc.
Figure 4A:
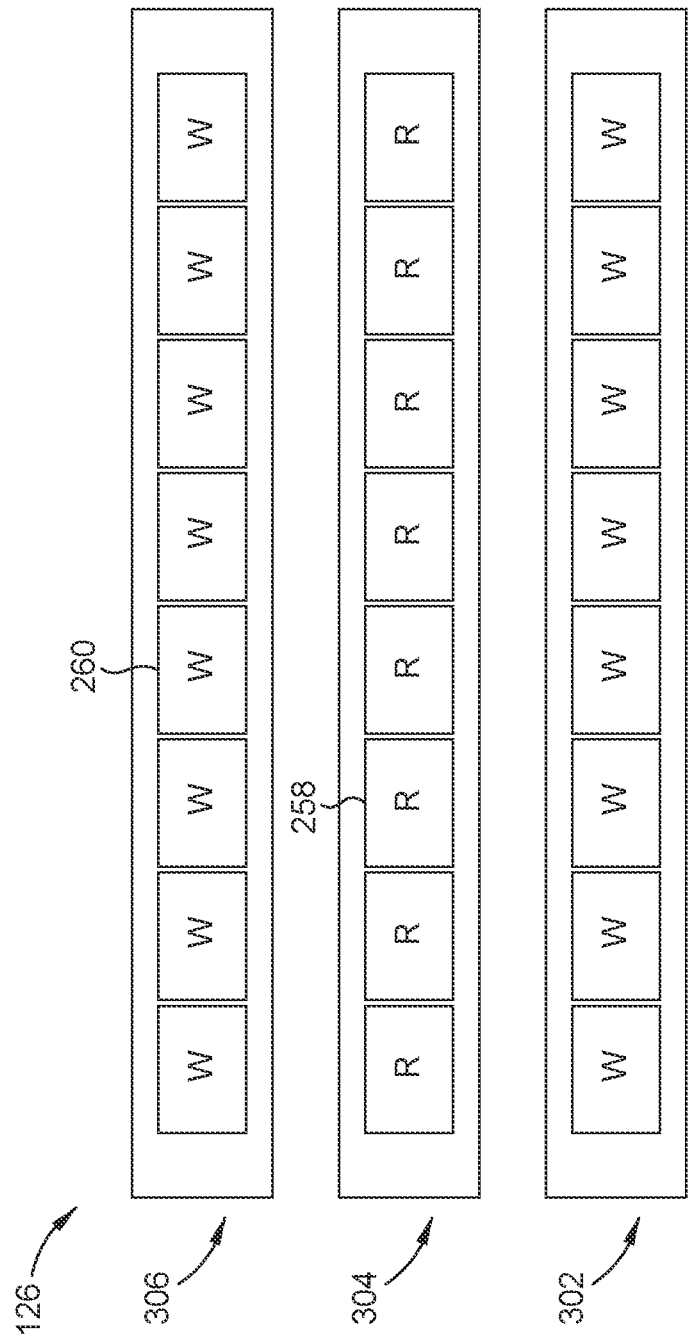
FIGS. 4A-4B illustrate various configurations for the first, second and third modules of FIG. 3.
Figure 4B:
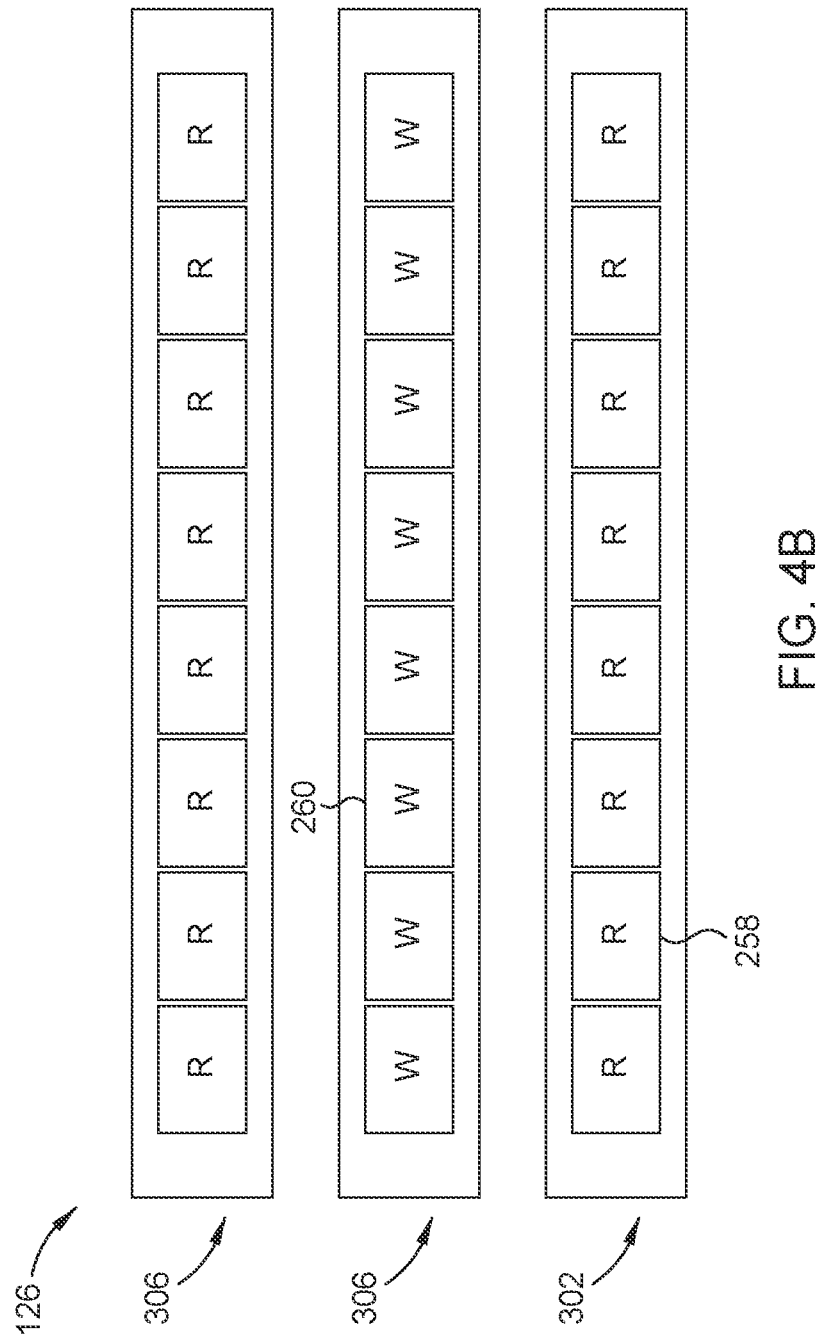

FIG. 3 illustrates a magnetic recording head 126 according to one approach of the present disclosure that includes first, second and third modules 302, 304, 306 each having a media facing surface 308, 310, 312 respectively, which may be flat, contoured, etc. FIGS. 4A-4B illustrate various configurations for the first, second and third modules 302, 304, 306 of FIG. 3.

For explanation purposes, the first module 302, or the leading module 302, is the first module encountered by the tape 315 in a three module design for tape 315 moving in the indicated direction by arrow 350. The third module 306, or the trailing module 306, follows the middle module 304 and is the last module seen by the tape 315 in a three module design. The leading and trailing modules 302, 306 are referred to collectively as outer modules. Also note that the outer modules 302, 306 will alternate as leading modules, depending on the direction of travel of the tape 315.

In a write-read-write (W-R-W) head, outer modules for writing flank one or more inner modules for reading. FIG. 4A illustrates a W-R-W configuration, the outer modules 302, 306 each include one or more arrays of writers (W) 260. The inner module 304 of FIG. 4A includes one or more arrays of readers (R) 258 in a similar configuration. Variations of a multi-module head include a R-W-R head, like shown in FIG. 4B, a R-R-W head, a W-W-R head, etc. In yet other variations, one or more of the modules may have read/write pairs of transducers. While the simplified conceptual drawings show each module comprising 8 readers 258 or 8 writers 260, each module may include a greater number of readers 258 and/or writers 260 (e.g., 32/33 or 64/66 as described in the later figures).

Writing and reading functions are performed by different modules at any given time. In one approach, the second module 304 includes a plurality of readers (such as the readers 258 of FIGS. 4A-4B) and optional servo readers 331 and no writers. The first and third modules 302, 306 include a plurality of writers 322 and no data readers, with the exception that the outer modules 302, 306 may include optional servo readers. The writers 322 may be the writers 260 of FIGS. 4A-4B. The servo readers may be used to position the head during reading and/or writing operations. The servo reader(s) on each module are typically located towards the end of the array of readers or writers.

In one approach, the media facing surfaces 308, 310, 312 of the first, second, and third modules 302, 304, 306 lie on about parallel planes, and the media facing surface 310 of the second module 304 is above the media facing surfaces 308, 312 of the first and third modules 302, 306. Such a configuration has the effect of creating the desired wrap angle of the tape 315 relative to the media facing surface 310 of the second module 304.

Where the media facing surfaces 308, 310, 312 lie along parallel or nearly parallel yet offset planes, a vacuum created by a skiving edge 318 of the leading module 302 is sufficient to keep the tape 315 adhered to the media facing surface 308 of the leading module 302. A trailing edge 320 of the leading module 302 (the end from which the tape 315 leaves the leading module 302) is the approximate reference point which defines a wrap angle over the media facing surface 310 on the leading edge 311 of the second module 304. The tape 315 stays in close proximity to the media facing surface 308 until close to the trailing edge 320 of the leading module 302. Accordingly, the writers 322 may be located near the trailing edges of the outer modules 302, 306.

Beneficially, the inner wrap angle on the leading edge 311 of the module 304 receiving the tape 315 will be larger than the inner wrap angle on the trailing edge 313, as the tape 315 rides above the trailing module 306. This difference is generally beneficial as a smaller inner wrap angle on the trialing edge 313 tends to oppose what has heretofore been a steeper exiting effective wrap angle.

The media facing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the media facing surface 312 so there is virtually no wear on the elements when tape is moving in this direction. Particularly, the tape 315 entrains air and so will not significantly ride on the media facing surface 312 of the third module 306 (some contact may occur). This is permissible, because the leading module 302 is writing while the trailing module 306 is idle.

As shown in FIG. 3, the first, second, and third modules 302, 304, 306 each have a closure 332, 334, 336, which extends the media facing surface of the associated module, thereby effectively positioning the read/write elements away from the edge of the media facing surface. In some aspects, the second module 304 has a closure, while the first and third modules 302, 306 do not have a closure. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some approaches is ideal for stabilizing tape motion over the second module 304.

Figure 5:
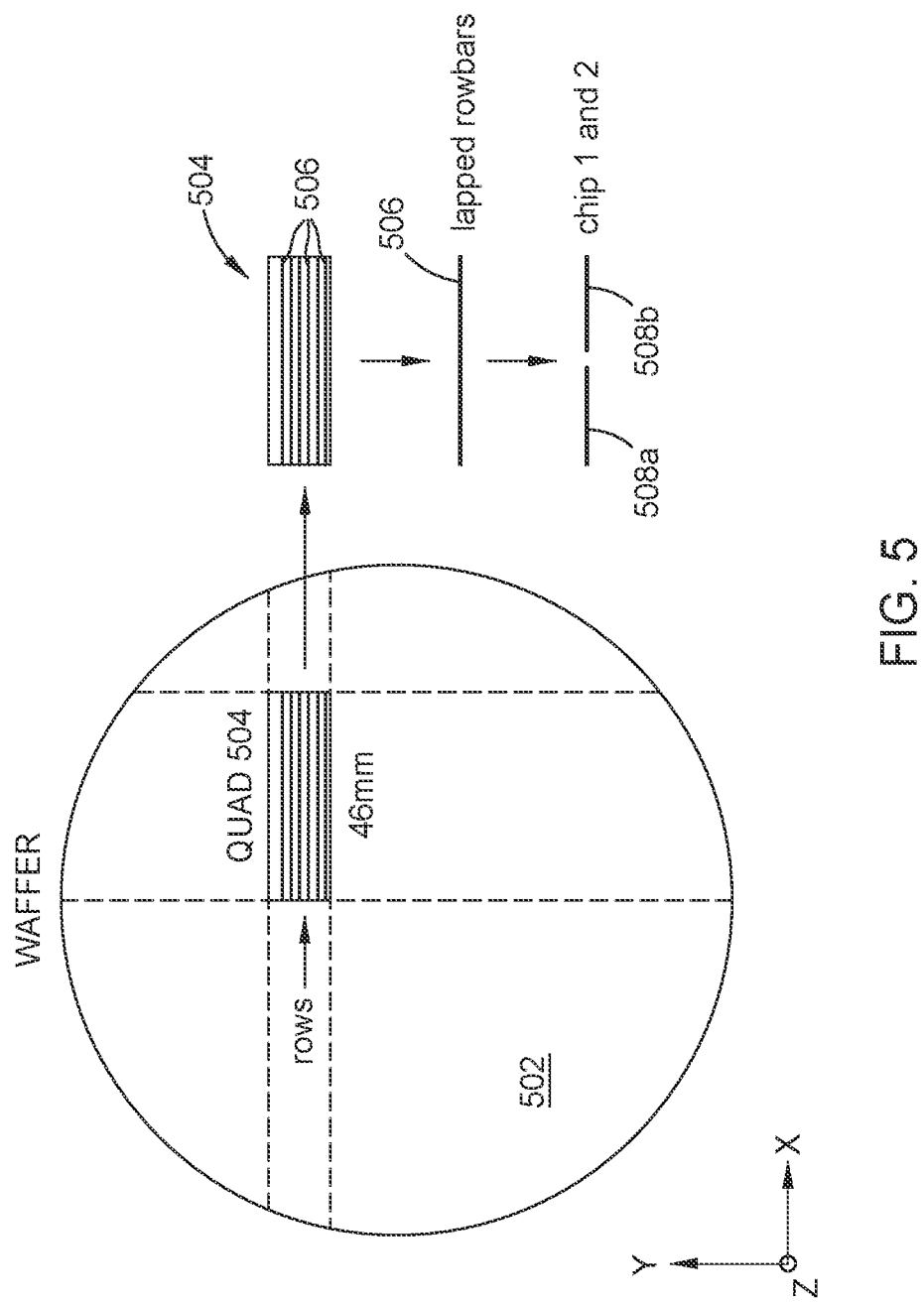
FIG. 5 illustrates a plan view of how chips of tape head modules are formed, according to one embodiment.

FIG. 5 illustrates a plan view of how chips 508a, 508b of tape head modules are formed, according to one embodiment. Each tape head module comprises a plurality of write elements, a plurality of read elements, and/or one or more servo element pairs, as discussed above in FIG. 2. Each tape head module may be the tape head module 200 of FIG. 2.

Figure 6:
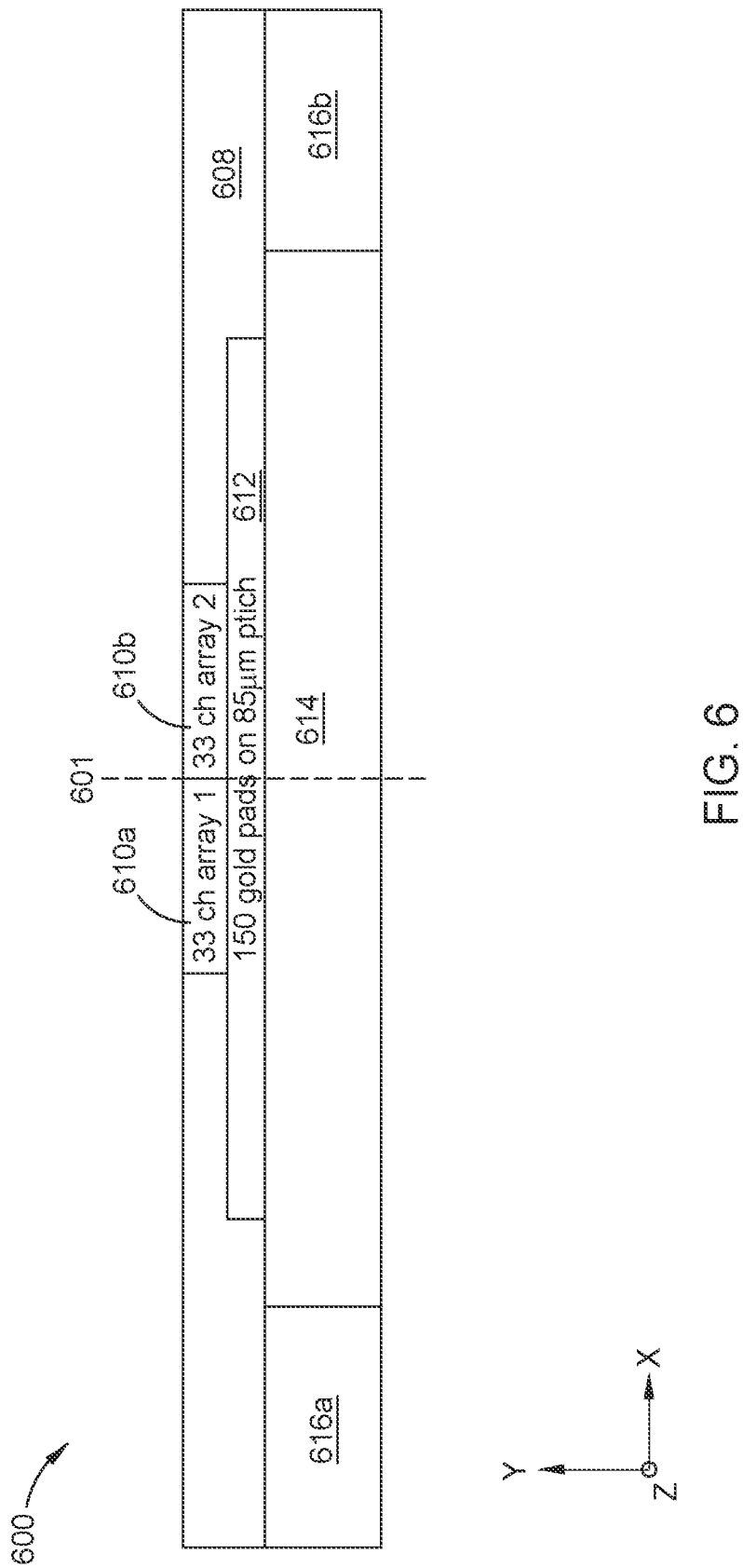
FIG. 6 illustrates a plan view of a tape head module, according to one embodiment.

A plurality of tape head chips 508a, 508b are built on a wafer 502. The wafer 502 is organized into a plurality of quadrants or quads 504. Each quad 504 has a width in the x-direction of about 46 mm. Each quad 504 is then further divided into a plurality of rowbars 506, such as about 17 rowbars 506. Each rowbar 506 is then divided into two chips 508a, 508b. Each chip 508a, 508b has a width in the x-direction of about 22.5 mm. A plurality of pads is then formed on each chip 508a, 580b, and a plurality of data elements is formed on each chip 508a, 508b, where each data element is connected to two pads. As shown in FIG. 6, each chip 508a, 508b comprises 64 to 66 data elements and one or more pairs of servo elements, where the data elements and servo elements of each chip 508a, 580b are formed concurrently. The data elements may be write elements or read elements.

FIG. 6 illustrates a plan view of a conventional tape head module 600. The tape head module 600 comprises a first data element array 610a and a second data element array 610b disposed on a chip 608. The chip 608 may be either the first or second chip 508a, 508b of FIG. 5. The first and second data element arrays 610a, 610b are each individually coupled to a plurality of pads 612, such as about 150 pads 612 (shown as one large pad). The pads 612 may comprise gold, for example. The chip 608, which comprises the first and second data element arrays 610a, 610b and the plurality of pads 612, is disposed on a u-beam 614, where the u-beam 614 comprises a first u-beam leg 616a and a second u-beam leg 616b. As shown in FIG. 6, the first and second data element arrays 610a, 610b and the plurality of pads 612 are centered on the chip 608 between the u-beam legs 616a, 616b, as shown by centerline 601.

The first and second data element arrays 610a, 610b each individually comprises 33 data elements, which may be write elements and/or read elements. The first and second data element arrays 610a, 610b each individually further comprises one or more servo element pairs. In a half-high drive, 32 data elements and one or more servo element pairs of either data element array 610a, 610b are concurrently functional. In a full-high drive, 64 data elements and one or more servo element pairs of the data element arrays 610a, 610b are concurrently functional. During operation, the tape moves over the tape head module 600 in the z-direction and the −z-direction.

FIGS. 7, 8, 9, 10A, and 11 illustrate various plan views of tape head modules 700, 800, 900, 1000, 1100, respectively, according to various embodiments. FIG. 10B illustrates a tape head assembly 1050 comprising three tape head modules 1000 of FIG. 10A, according to one embodiment. During operation, the tape moves over each tape head module 700, 800, 900, 1000, 1100 in the z-direction and the −z-direction.

Each tape head module 700, 800, 900, 1000, and 1100 may be utilized within a tape drive comprising a controller, such as the captive tape drive or other tape drive (e.g. LTO) 100 of FIG. 1A. Each tape head module 700, 800, 900, 1000, and 1100 may be utilized with, or be a part of, the tape head module 200 of FIG. 2. Each tape head module 700, 800, 900, 1000, and 1100 may be utilized with, or be a part of, the magnetic recording head 126 of FIG. 3. While one tape head module is shown in FIGS. 7, 8, 9, 10A, and 11, a magnetic recording head, such as the magnetic recording head 126 of FIG. 3, may comprise two or more tape head modules arranged in any write and read configuration, such as discussed above in FIGS. 3-4B and like shown in FIG. 10B.

Figure 7:
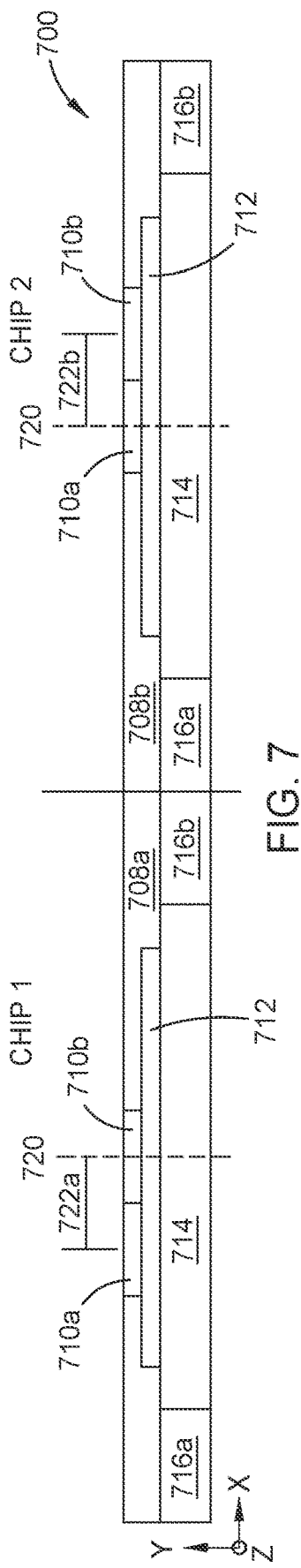
FIG. 7 illustrates a plan view of a tape head module, according to one embodiment.

FIG. 7 illustrates a tape head module 700 comprising two chips 708a, 708b. Each chip 708a, 708b individually comprises a first data element array 710a and a second data element array 710b disposed thereon. The first and second data element arrays 710a, 710b of each chip 708a, 708b are disposed at a media facing surface (MFS). The first and second data element arrays 710a, 710b of each chip 708a, 708b are each individually coupled to a plurality of pads 712, such as about 150 pads 712 (shown as one large pad). The pads 712 may comprise gold, for example, and connect to various wires to make each write element or read element functional. The chips 708a, 708b are each individually disposed on a u-beam 714, where each u-beam 714 comprises a first u-beam leg 716a and a second u-beam leg 716b. Each chip 708a, 708b has a length in the x-direction of about 22.5 mm. In some embodiments, the first chip 708a comprises left-hand write elements (like the first tape head module 1000a of FIG. 10B) and the second chip 708b comprises right-hand write elements (like the third tape head module 1000c of FIG. 10B). In other embodiments, each chip 708a, 708b comprises read elements and can be used, for example, as the second head module 1000b of FIG. 10B. More generally, different combinations of chips 708a and 708b made with write or read elements can be used in other configurations besides that of FIG. 10B, such as read-write-read or write-read-write with different shifting arrangements.

The first and second data element arrays 710a, 710b of each chip 708a, 708b each individually comprises 33 data elements, which may be write elements and/or read elements. The first and second data element arrays 710a, 710b of each chip 708a, 708b each individually further comprises one or more servo element pairs. In a half-high drive, 32 data elements and one or more servo element pairs of either data element array 710a, 710b of each chip 708a, 708b are concurrently functional. In a full-high drive, 64 data elements and one or more servo element pairs of the data element arrays 710a, 710b of each chip 708a, 708b are concurrently functional.

In the tape head module 700, the first and second data element arrays 710a, 710b disposed on the first chip 708a are shifted in the −x-direction towards the first u-beam leg 716a (e.g., to the left), such that the second data element array 710b of the first chip 708a is centered upon a central axis 720. The first and second data element arrays 710a, 710b disposed on the first chip 708a are shifted in the −x-direction a distance 722a of about one-half the span of either the first or second data element array, such as about 1 mm to about 2 mm, from the central axis 720. The pads 712 of the first chip 708a are also centered upon the central axis 720. The first and second data element arrays 710a, 710b disposed on the second chip 708b are shifted in the x-direction towards the second u-beam leg 716b (e.g., to the right), such that the first data element array 710a of the second chip 708b is centered upon the central axis 720. The first and second data element arrays 710a, 710b disposed on the second chip 708b are shifted in the x-direction a distance 722b of about one-half the span of either the first or second data element array, such as about 1 mm to about 2 mm, from the central axis 720 depending on the width of the data element arrays 710a, 710b. The pads 712 of the second chip 708b are also centered upon the central axis 720.

Figure 8:
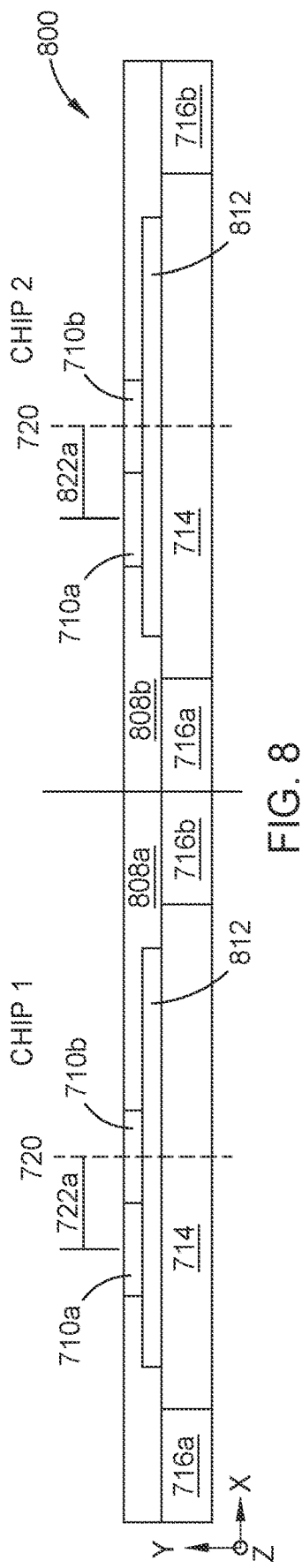
FIG. 8 illustrates a plan view of a tape head module, according to another embodiment.

The tape head module 800 of FIG. 8 is similar to the tape head module 700 of FIG. 7 where the first and second data element arrays 710a, 710b disposed on a first chip 808a are shifted in the −x-direction towards the first u-beam leg 716a (e.g., to the left), away from a second chip 808b, such that the second data element array 710b of the first chip 808a is centered upon the central axis 720.

However, the first and second data element arrays 710a, 710b disposed on the second chip 808b are also shifted in the −x-direction towards the first u-beam leg 716a (e.g., to the left), towards the first chip 808a, such that the second data element array 710b of the second chip 808b is centered upon the central axis 720. The first and second data element arrays 710a, 710b disposed on the second chip 808b are shifted in the −x-direction a distance 822b of about one-half the span of either the first or second data element array, such as about 1 mm to about 2 mm, from the central axis 720. The pads 812 coupled to each chip 808a, 808b are centered upon the central axis 720 as well. Thus, rather than the first and second data element arrays 710a, 710b of each chip 808a, 808b being shifted away from one another, the first and second data element arrays 710a, 710b of each chip 808a, 808b are shifted in the same direction.

The pads 812 may comprise gold, for example, and connect to various wires to make each write element or read element functional. Each chip 808a, 808b has a length in the x-direction of about 22.5 mm. In some embodiments, the first chip 808a comprises left-hand write elements (like the first tape head module 1000a of FIG. 10B) and the second chip 808b comprises right-hand write elements (like the third tape head module 1000c of FIG. 10C). In other embodiments, each chip 808a, 808b comprises read elements and can be used, for example, as the second head module 1000b of FIG. 10B. More generally, different combinations of chips 808a and 808b made with write or read elements can be used in other configurations besides that of FIG. 10B, such as read-write-read or write-read-write with different shifting arrangements.

Figure 9:
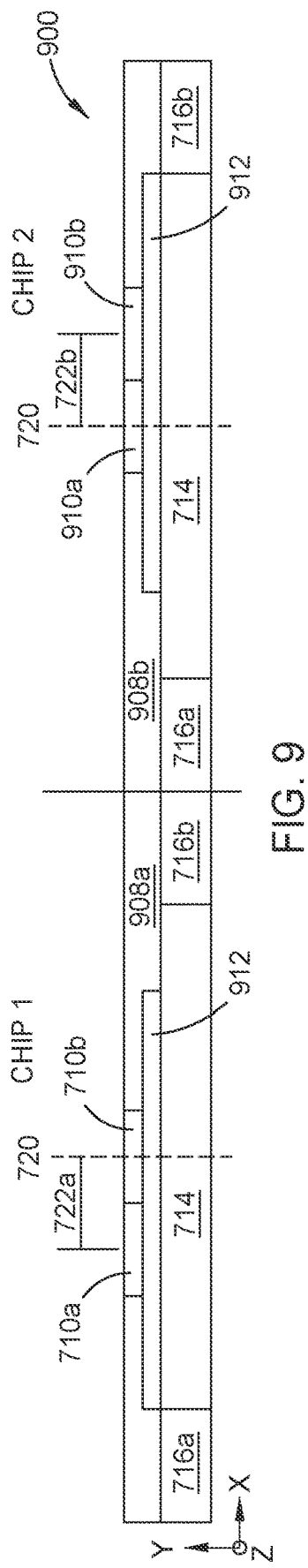
FIG. 9 illustrates a plan view of a tape head module, according to yet another embodiment.

The tape head module 900 of FIG. 9 is similar to the tape head module 700 of FIG. 7 where the first and second data element arrays 710a, 710b disposed on a first chip 908a are shifted in the −x-direction towards the first u-beam leg 716a (e.g., to the left), away from a second chip 908b, such that the second data element array 710b of the first chip 908a is centered upon the central axis 720, and the first and second data element arrays 710a, 710b disposed on the second chip 908b are shifted in the x-direction towards the second u-beam leg 716b (e.g., to the right), away from the first chip 908a, such that the first data element array 710a of the second chip 908b is centered upon the central axis 720.

However, in the tape head module 900, the pads 912 of each chip 908a, 908b are also shifted. The pads 912 of the first chip 908a are shifted the distance 722a of about one-half the span of either the first or second data element array, such as about 1 mm to about 2 mm, from the central axis 720 and the pads 912 of the second chip 908b are shifted the distance 822a of about one-half the span of either the first or second data element array, such as about 1 mm to about 2 mm, from the central axis 720. The pads 912 of the first chip 908a are shifted in the −x-direction towards the first u-beam leg 716a such that the first and second data element arrays 710a, 710b are centered over the pads 912. The pads 912 of the second chip 908b are shifted in the x-direction towards the second u-beam leg 716b such that the first and second data element arrays 710a, 710b are centered over the pads 912. Thus, the pads 912 of the first and second chips 908a, 908b are also shifted away from one another.

The pads 912 may comprise gold, for example, and connect to various wires to make each write element or read element functional. Each chip 908a, 908b has a length in the x-direction of about 22.5 mm. In some embodiments, the first chip 908a comprises left-hand write elements (like the first tape head module 1000a of FIG. 10B) and the second chip 908b comprises right-hand write elements (like the third tape head module 1000c of FIG. 10C). In other embodiments, each chip 908a, 908b comprises read elements and can be used, for example, as the second head module 1000b of FIG. 10B. More generally, different combinations of chips 908a and 908b made with write or read elements can be used in other configurations besides that of FIG. 10B, such as read-write-read or write-read-write with different shifting arrangements.

The tape head module 1000 of FIG. 10A is similar to the tape head module 800 of FIG. 8 where the first and second data element arrays 710a, 710b of both the first and second chips 1008a, 1008b are shifted in the −x-direction towards the first u-beam leg 716a (e.g., to the left) such that the second data element array 710b of each of the first and second chips 1008a, 1008b are centered upon the central axis 720. However, in the tape head module 1000, the pads 1012 of each chip 1008a, 1008b are also shifted in the −x-direction towards the first u-beam leg 716a such that the first and second data element arrays 710a, 710b are centered over the pads 1012. The pads 1012 of the first chip 1008a are shifted the distance 722a of about one-half the span of either the first or second data element array, such as about 1 mm to about 2 mm, from the central axis 720 and the pads 1012 of the second chip 1008b are shifted the distance 822b of about one-half the span of either the first or second data element array, such as about 1 mm to about 2 mm, from the central axis 720.

The pads 1012 may comprise gold, for example, and connect to various wires to make each write element or read element functional. Each chip 1008a, 1008b has a length in the x-direction of about 22.5 mm. In some embodiments, the first chip 1008a comprises left-hand write elements (like the first tape head module 1000a of FIG. 10B) and the second chip 1008b comprises right-hand write elements (like the third tape head module 1000c of FIG. 10B). In other embodiments, each chip 1008a, 1008b comprises read elements and can be used, for example, as the second head module 1000b of FIG. 10B. More generally, different combinations of chips 1008a and 1008b made with write or read elements can be used in other configurations besides that of FIG. 10B, such as read-write-read or write-read-write with different shifting arrangements.

Figure 11:
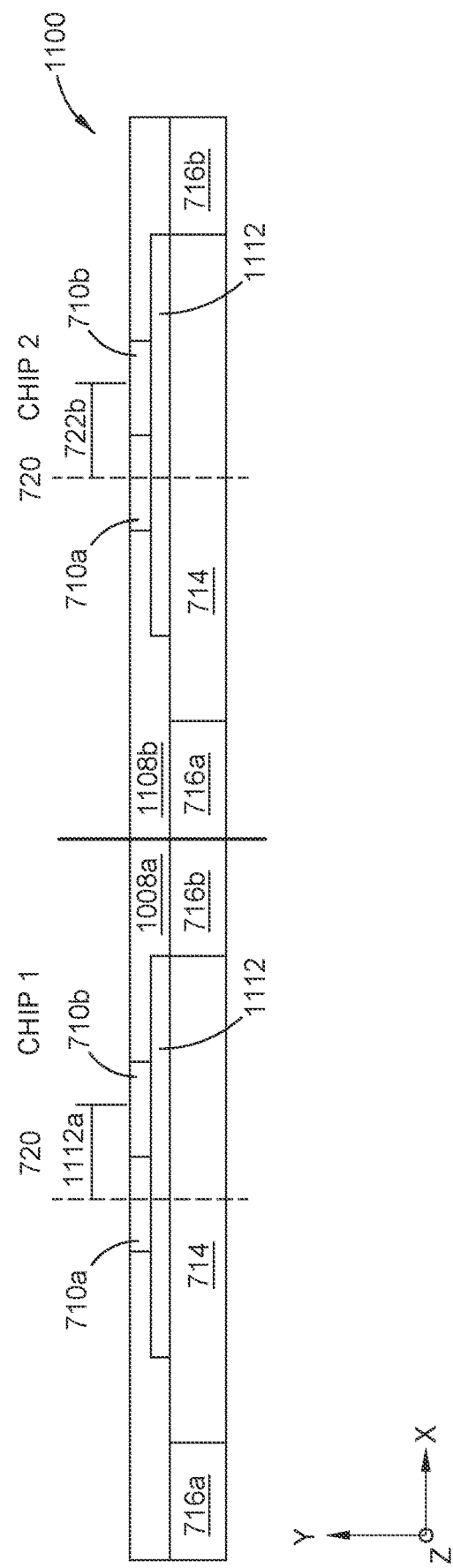
FIG. 11 illustrates a plan view of a tape head module, according to another embodiment.

The tape head module 1100 of FIG. 11 is similar to the tape head module 1000 of FIG. 10A; however, the first and second data element arrays 710a, 710b and the pads 1112 of both the first and second chips 1108a, 1108b are shifted in the x-direction towards the second u-beam leg 716b (e.g., to the right) such that the first data element array 710a of each of the first and second chips 1108a, 1108b are centered upon the central axis 720. The first and second data element arrays 710a, 710b disposed on the first chip 1108a are shifted in the x-direction a distance 1122a of about one-half the span of either the first or second data element array, such as about 1 mm to about 2 mm, from the central axis 720. The pads 1112 of the first chip 1108a are shifted the distance 1122a of about one-half the span of either the first or second data element array, such as about 1 mm to about 2 mm, from the central axis 720 and the pads 1112 of the second chip 1108b are shifted the distance 722b of about one-half the span of either the first or second data element array, such as about 1 mm to about 2 mm, from the central axis 720.

The pads 1112 may comprise gold, for example, and connect to various wires to make each write element or read element functional. Each chip 1108a, 1108b has a length in the x-direction of about 22.5 mm. In some embodiments, the first chip 1108a comprises left-hand write elements (like the first tape head module 1000a of FIG. 10B) and the second chip 1108b comprises right-hand write elements (like the third tape head module 1000c of FIG. 10C). In other embodiments, each chip 1108a, 1108b comprises read elements and can be used, for example, as the second head module 1000b of FIG. 10B. More generally, different combinations of chips 1108a and 1108b made with write or read elements can be used in other configurations besides that of FIG. 10B, such as read-write-read or write-read-write with different shifting arrangements.

FIG. 10B illustrates a tape head assembly 1050 comprising three tape head modules 1000a, 1000b, 1000c of FIG. 10A, according to one embodiment. The tape head assembly 1050 may be the magnetic recording head 126 of FIG. 3. For example, the tape head module 1000a may be the module 306 of FIG. 3, the tape head module 1000b may be the module 304 of FIG. 3, and the tape head module 1000c may be the module 302 of FIG. 3.

In the tape head assembly 1050, the first tape head module 1000a comprises a plurality of write elements and one or more servo element pairs, the second tape head module 1000b comprises a plurality of read elements and one or more servo element pairs, and the third tape head module 1000c comprises a plurality of write elements and one or more servo element pairs. However, as noted above, other configurations of the three tape head modules 1000a, 1000b, 1000c are possible, such as a read-write-read configuration.

During operation, when a tape moves over the tape head assembly 1050 in a first direction, such as the y-direction, the first tape head module 1000a writes data to the tape and the second tape head module 1000b reads the data. When the tape moves over the tape head assembly 1050 in a second direction opposite the first direction, such as the −y-direction, the third tape head module 1000c writes data to the tape and the second tape head module 1000b reads the data.

Shifting the first and second data element assemblies and the pads of each chip in the same direction creates more space within the tape head modules, allowing the tape head modules to be retrofitted in current tape drives, such as linear tape open (LTO) tape drives (i.e., backwards compatibility). Furthermore, by shifting the first and second data element assemblies and the pads of each chip in the same direction, more channels or data tracks of a tape can be written and read to. As such, the overall data rate of the tape drive comprising the 66 channel tape head module(s) is increased, and the overall writing and reading speed is increased as well.

In one embodiment, a tape head module comprises a chip, a first data element array disposed on the chip, the first data element array comprising a first plurality of data elements, a second data element array disposed on the chip, the second data element array comprising a second plurality of data elements, and a plurality of pads coupled to the first plurality of data elements and to the second plurality of data elements, wherein the first data element array, the second data element array, and the plurality of pads are shifted, from a central axis of the chip, a distance of about one-half the span of either the first or second data element array in a first direction.

The second data element array is centered upon the central axis of the chip. The first plurality of data elements and the second plurality of data elements each individually comprises 33 data elements and one or more servo element pairs. The data elements of the first plurality of data elements and the second plurality of data elements are write elements. The data elements of the first plurality of data elements and the second plurality of data elements are read elements. The first data element array and the second data element array are centered over the plurality of pads. A tape drive comprises the tape head module.

In another embodiment, a tape drive comprises a first tape head module, the first tape head module comprising: a first chip, a first data element array disposed on the first chip, the first data element array comprising a first plurality of write elements, a second data element array disposed on the first chip, the second data element array comprising a second plurality of write elements, and a first plurality of pads coupled to the first plurality of write elements and to the second plurality of write elements, wherein the first plurality of pads are shifted, from a central axis of the chip, a distance of about one-half the span of either the first or second data element array in a first direction, and wherein the second data element array is centered upon the central axis of the first chip.

The first data element array and the second data element array are shifted the distance of about one-half the span of either the first or second data element array in the first direction. The tape drive further comprises a second tape head module disposed adjacent to the first tape head module, the second tape head module comprising: a second chip, a third data element array disposed on the second chip, the third data element array comprising a first plurality of read elements, a fourth data element array disposed on the second chip, the fourth data element array comprising a second plurality of read elements, and a second plurality of pads coupled to the first plurality of read elements and to the second plurality of read elements, wherein the second plurality of pads are shifted the distance of about one-half the span of either the first or second data element array in the first direction, and wherein the fourth data element array is centered upon a central axis of the second chip. The third data element array and the fourth data element array are shifted the distance of about one-half the span of either the first or second data element array in the first direction.

The tape drive further comprises a third tape head module disposed adjacent to the second tape head module, the third tape head module comprising: a third chip, a fifth data element array disposed on the third chip, the fifth data element array comprising a third plurality of write elements, a sixth data element array disposed on the third chip, the sixth data element array comprising a fourth plurality of write elements, and a third plurality of pads coupled to the third plurality of write elements and to the fourth plurality of write elements, wherein the third plurality of pads are shifted the distance of about one-half the span of either the first or second data element array in the first direction, and wherein the sixth data element array is centered upon a central axis of the third chip. The fifth data element array and the sixth data element array are shifted the distance of about one-half the span of either the first or second data element array in the first direction. The first, second, third, and fourth plurality of write elements each individually comprises 33 write elements and one or more servo element pairs, and wherein the first and third plurality of read elements each individually comprises 33 read elements and one or more servo element pairs.

In yet another embodiment, a method of forming tape head module comprises dividing a wafer into a plurality of quadrants, dividing each quadrant into a plurality of rowbars, dividing each rowbar into a first chip and a second chip, forming a plurality of pads on each of the first and second chips, forming a first data element array on each of the first and second chips, the first data element array comprising a first plurality of data elements, wherein each data element of the first plurality of data elements is coupled to a pad of the plurality of pads, and forming a second data element array on each of the first and second chips, the second data element array comprising a second plurality of data elements, the second data element array being disposed adjacent to the first data element array, wherein each data element of the second plurality of data elements is coupled to a pad of the plurality of pads, wherein the first data element array, the second data element array, and the plurality of pads are shifted, from a central axis of the chip, a distance of about one-half the span of either the first or second data element array in a first direction.

The first data element array of each chip is centered upon the central axis of each chip. Each rowbar has a length of about 46 mm, and wherein the first chip and the second chip each have a length of about 22.5 mm. The first plurality of data elements and the second plurality of data elements of each chip each individually comprises 33 write elements and one or more servo element pairs. The first plurality of data elements and the second plurality of data elements of each chip each individually comprises 33 read elements and one or more servo element pairs. A tape drive comprises the formed tape head modules.

While the foregoing is directed to embodiments of the present disclosure, other and further embodiments of the disclosure may be devised without departing from the basic scope thereof, and the scope thereof is determined by the claims that follow.

What is claimed is:

1. A tape head module, comprising:
   a chip;
   a first data element array disposed on the chip, the first data element array comprising a first plurality of data elements;
   a second data element array disposed on the chip, the second data element array comprising a second plurality of data elements; and
   a plurality of pads coupled to the first plurality of data elements and to the second plurality of data elements, wherein the first data element array, the second data element array, and the plurality of pads are shifted, from a central axis of the chip, a distance of about one-half the span of either the first or second data element array in a first direction.

2. The tape head module of claim 1, wherein the second data element array is centered upon the central axis of the chip.

3. The tape head module of claim 1, wherein the first plurality of data elements and the second plurality of data elements each individually comprises 33 data elements and one or more servo element pairs.

4. The tape head module of claim 1, wherein the data elements of the first plurality of data elements and the second plurality of data elements are write elements.

5. The tape head module of claim 1, wherein the data elements of the first plurality of data elements and the second plurality of data elements are read elements.

6. The tape head module of claim 1, wherein the first data element array and the second data element array are centered over the plurality of pads.

7. A tape drive comprising the tape head module of claim 1.

8. A tape drive, comprising:
   a first tape head module, the first tape head module comprising:
      a first chip;
      a first data element array disposed on the first chip, the first data element array comprising a first plurality of write elements;
      a second data element array disposed on the first chip, the second data element array comprising a second plurality of write elements; and
      a first plurality of pads coupled to the first plurality of write elements and to the second plurality of write elements, wherein the first plurality of pads are shifted, from a central axis of the chip, a distance of about one-half the span of either the first or second data element array in a first direction, and wherein the second data element array is centered upon the central axis of the first chip.

9. The tape drive of claim 8, wherein the first data element array and the second data element array are shifted the distance of about one-half the span of either the first or second data element array in the first direction.

10. The tape drive of claim 8, further comprising:
    a second tape head module disposed adjacent to the first tape head module, the second tape head module comprising:
       a second chip;
       a third data element array disposed on the second chip, the third data element array comprising a first plurality of read elements;
       a fourth data element array disposed on the second chip, the fourth data element array comprising a second plurality of read elements; and
       a second plurality of pads coupled to the first plurality of read elements and to the second plurality of read elements, wherein the second plurality of pads are shifted the distance of about one-half the span of either the first or second data element array in the first direction, and wherein the fourth data element array is centered upon a central axis of the second chip.

11. The tape drive of claim 10, wherein the third data element array and the fourth data element array are shifted the distance of about one-half the span of either the first or second data element array in the first direction.

12. The tape drive of claim 10, further comprising:
    a third tape head module disposed adjacent to the second tape head module, the third tape head module comprising:
       a third chip;
       a fifth data element array disposed on the third chip, the fifth data element array comprising a third plurality of write elements;
       a sixth data element array disposed on the third chip, the sixth data element array comprising a fourth plurality of write elements; and
       a third plurality of pads coupled to the third plurality of write elements and to the fourth plurality of write elements, wherein the third plurality of pads are shifted the distance of about one-half the span of either the first or second data element array in the first direction, and wherein the sixth data element array is centered upon a central axis of the third chip.

13. The tape drive of claim 12, wherein the fifth data element array and the sixth data element array are shifted the distance of about one-half the span of either the first or second data element array in the first direction.

14. The tape drive of claim 12, wherein the first, second, third, and fourth plurality of write elements each individually comprises 33 write elements and one or more servo element pairs, and wherein the first and second plurality of read elements each individually comprises 33 read elements and one or more servo element pairs.

15. A method of forming tape head modules, comprising:
    dividing a wafer into a plurality of quadrants;
    dividing each quadrant into a plurality of rowbars;
    dividing each rowbar into a first chip and a second chip;
    forming a plurality of pads on each of the first and second chips;
    forming a first data element array on each of the first and second chips, the first data element array comprising a first plurality of data elements, wherein each data element of the first plurality of data elements is coupled to a pad of the plurality of pads; and
    forming a second data element array on each of the first and second chips, the second data element array comprising a second plurality of data elements, the second data element array being disposed adjacent to the first data element array, wherein each data element of the second plurality of data elements is coupled to a pad of the plurality of pads,
    wherein the first data element array, the second data element array, and the plurality of pads are shifted, from a central axis of the chip, a distance of about one-half the span of either the first or second data element array in a first direction.

16. The method of claim 15, wherein the first data element array of each chip is centered upon the central axis of each chip.

17. The method of claim 15, wherein each rowbar has a length of about 46 mm, and wherein the first chip and the second chip each have a length of about 22.5 mm.

18. The method of claim 15, wherein the first plurality of data elements and the second plurality of data elements of each chip each individually comprises 33 write elements and one or more servo element pairs.

19. The method of claim 15, wherein the distance is about 1 mm to about 2 mm.

20. A tape drive comprising the tape head modules formed by the method of claim 15.

* * * * *